United States Patent [19]

Launder

[11] Patent Number: 4,576,239
[45] Date of Patent: Mar. 18, 1986

[54] SCARIFIER TOOTH ASSEMBLY

[76] Inventor: Richard L. Launder, 8107 San Lucas Dr., Whittier, Calif. 90605

[21] Appl. No.: 644,627

[22] Filed: Aug. 27, 1984

[51] Int. Cl.[4] .......................... E02F 9/28; A01B 23/02
[52] U.S. Cl. .................................... 172/751; 172/762; 172/753; 37/142 R
[58] Field of Search .............. 172/713, 719, 749, 751, 172/762, 753; 37/142 R, 141 T, 142 A

[56] References Cited

U.S. PATENT DOCUMENTS

| | | | |
|---|---|---|---|
| 2,222,071 | 11/1940 | Gustafson | 172/762 |
| 2,729,902 | 1/1956 | Launder | 37/142 R |
| 2,737,103 | 3/1956 | Renault | 172/762 |
| 3,020,655 | 2/1962 | Launder | 37/142 A |
| 3,082,555 | 3/1963 | Hill | 37/142 R |
| 3,098,532 | 7/1963 | Dobbratz | 172/719 |
| 3,536,147 | 10/1970 | Norton | 172/719 |

*Primary Examiner*—Richard J. Johnson
*Attorney, Agent, or Firm*—Lyon & Lyon

[57] ABSTRACT

A scarifier tooth assembly of the type used on earth excavation equipment for digging furrows in the ground which comprises a replacement point and a clamp member for securing the point to a conventional tapered and grooved shank carried by the bucket of the earth excavating equipment. The point is of a forged integral construction and includes a tapered forward digging portion and a shaft portion extending rearwardly therefrom. The shaft portion defines a flat lower bearing surface adapted to abut a flat bearing surface on the shank and a curvilinear upper bearing surface adapted to abut an interior curvilinear bearing surface of the clamp member. Ear members project laterally from the rearward most end of the shaft portion of the point and fit about the shank for preventing relative lateral movement between the point and shank. The clamp member is generally of an inverted "U"-shaped configuration and defines an inner curvilinear bearing surface and inwardly projecting lateral flanges at the open end thereof. Upon slighting the clamp over the point and shank, the projecting flanges fit within the locking grooves in the shank while the curvilinear bearing surface presses against the upper mating bearing surface on the shaft portion of the point, wedging and securing the point tightly between the clamp and shank.

15 Claims, 7 Drawing Figures

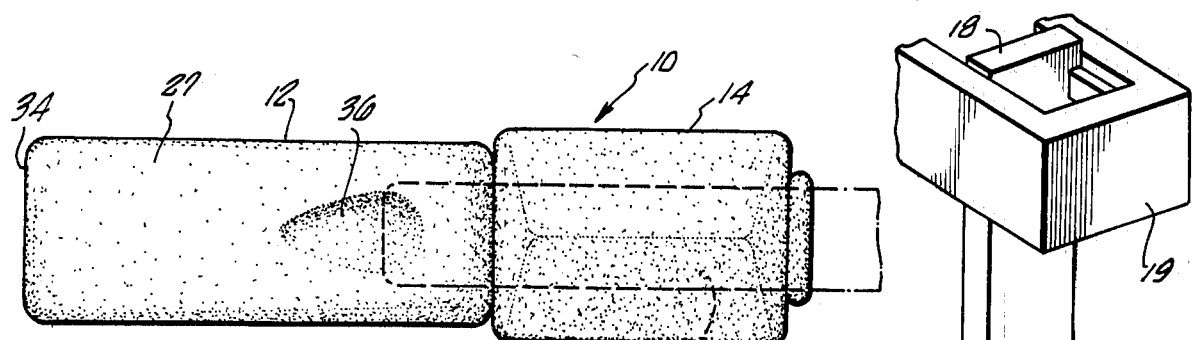
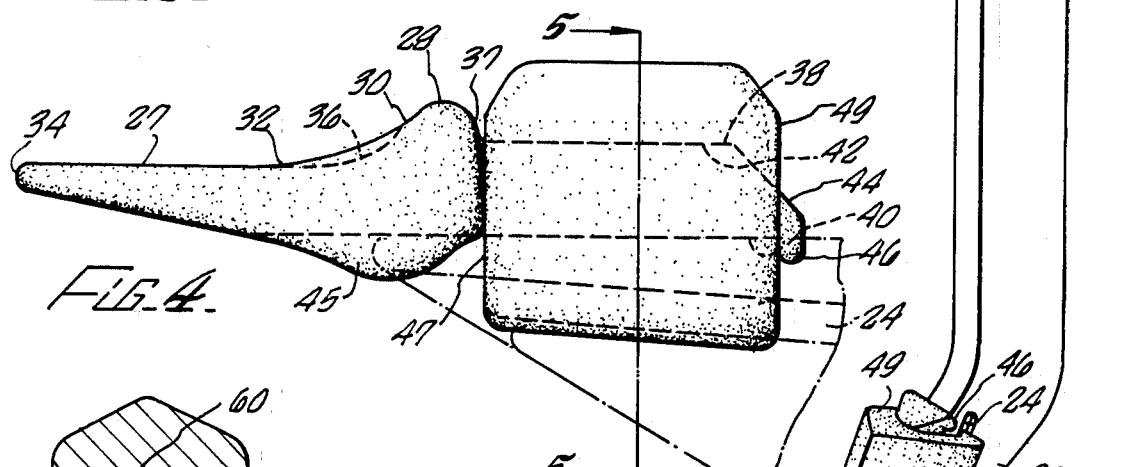
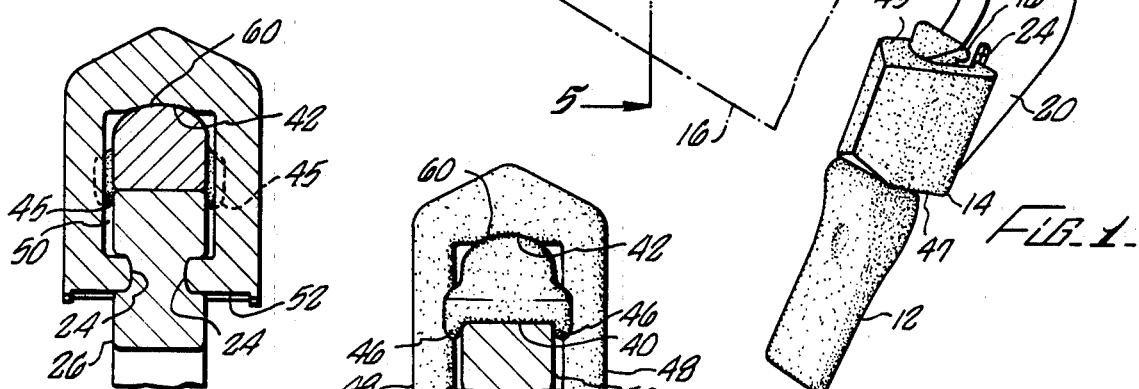
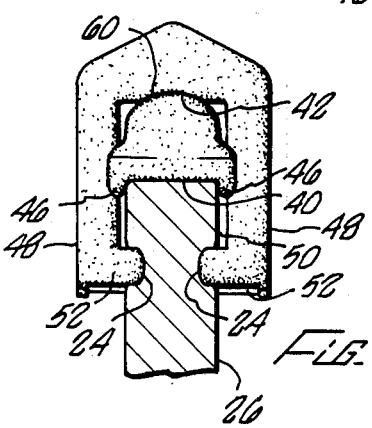
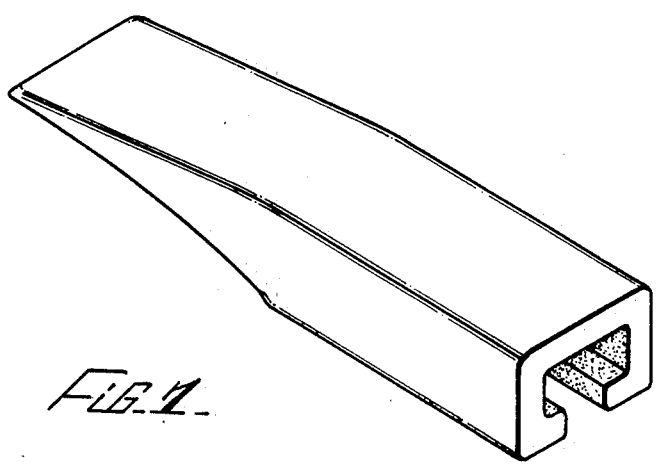
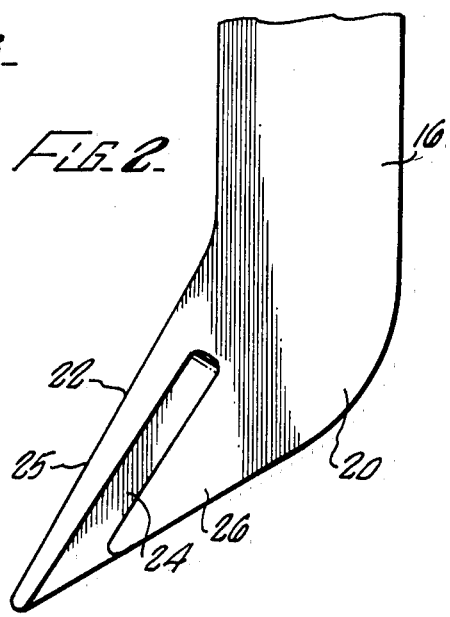

SCARIFIER TOOTH ASSEMBLY

BACKGROUND OF THE INVENTION

The present invention relates to a scarifier tooth assembly for use on motor grader for digging furrows in the ground. Such teeth are secured to the ripper bar of the grader by a plurality of elongated shanks. The shanks commonly used for this purpose are substantially "J"-shaped with the upper ends thereof being secured to the ripper bar and the lower ends each define a flat bearing surface against which the tooth is held and a pair of parallel locking grooves in the side walls thereof which are angularly disposed with respect to the bearing surface. The teeth used with such shanks are of integral construction having a forward tapered point or digging portion extending from an inverted "U"-shaped rear clamping portion. The clamping portion of the teeth defines a flat interior bearing surface which is adapted to abut the bearing surface on the shank and a pair of inwardly projecting lateral flanges which are slighted into the locking grooves in the lower portion of the shank. By forcing the tooth onto the shank, the flanges on the teeth are held within the locking grooves and the flat bearing surface on the underside of the clamp portion of the tooth is wedged against the bearing surface on the shank thereby securing the tooth to the lower portion of the shank.

While the aforesaid tooth construction is in widespread use, there are several problems inherent in its construction. First, the point or digging portion of such teeth wear out relatively rapidly. With this integral tooth-clamp construction, replacement of the point portion necessarily requires replacement of the clamp portion as well thereby increasing the cost of point replacement.

Secondly, this integral construction is difficult and expensive to fabricate. It should be forged and not cast due to the strength requirements and forging this tooth with the channels therein defined by the inwardly directed flanges is a difficult and expensive operation. Further, the point and clamping portions of the tooth have to be separately heat-treated to different degrees of hardness. The point which is the digging portion of the tooth must be hard to prevent wearing and withstand the forces generated during the digging operation. The rear portion of the tooth must be more ductile to withstand the clamping action. Separate heat-treating operations conducted on an element of integral construction again increase the cost of manufacture.

Thirdly, when the tooth is subjected to substantial vertical forces, a large portion of those forces are born by the softer flanges which extend into the locking grooves of the shank. These forces often result in a shearing of the flange, destroying the entire tooth.

Fourthly, the bearing surfaces on the shank and the underside of the clamping portion of the tooth which are wedged together are flat as are the walls forming the parallel locking grooves in the shank. While these flat surfaces are designed to prevent any lateral movement between the tooth and shank, inconsistencies in construction often result in an imperfect fit. As a result, either an improper fitment or no fitment at all is obtained which can require replacement of the entire assembly or result in breakage of the tooth.

The combination of each of the aforesaid shortcomings results in a short life and high replacement costs for scarifier teeth. It would therefore be desirable to provide a scarifier tooth assembly which is compatible with these conventional shanks yet which would allow for replacement of the point without the need to replace the clamp portion of the tooth, which would reduce the overall cost of manufacture both in the forging and heat-treating stages, which would accommodate inconsistencies in the locking grooves of the shank and which would still provide a rigid securement of the tooth to the shank in a manner so as not to subject portions thereof to inordinate shearing forces. The tooth assembly disclosed and claimed herein attains these objectives.

SUMMARY OF THE INVENTION

Briefly, the invention comprises a scarifier tooth assembly for use with a conventional shaft of the type having parallel locking grooves in the lower portion thereof angularly disposed with respect to a bearing surface against which the point of the tooth assembly is held. The tooth assembly comprises replaceable integrally formed elongated point and separate integrally formed clamp for securing the point against the bearing surface on the shank. The point includes a tapered forward digging portion, a shaft extending rearwardly therefrom defining a lower flat and upper curvilinear bearing surfaces and lateral projections intermediary of the ends thereof and at the rearward end thereof. The clamp is of an inverted "U"-shaped configuration defining an interior curvilinear bearing surface and is adapted to fit about and bear against the upper bearing surface of the shaft portion of the point in a curvilinear mated relationship and engage the locking grooves in the sidewalls of the shank. Upon the point with the clamp so disposed thereover being urged onto the shank with the clamp engaging the locking channels therein, the clamp wedges the lower surface of the shaft portion of the point against the bearing surface on the shank in a mating relationship and the upper surface of the shank against the interior curvilinear bearing surface of the clamp in a mating relationship while the lateral projections on the shaft portion of the point extend over and about portions of the shank to prevent any relative lateral movement between the point and the shank thereby tightly but releasably securing the point to the shank.

It is the primary object of the present invention to provide an improved scarifier tooth assembly for use with conventional shanks on motor graders.

It is another object of the present invention to provide a scarifier tooth assembly which allows the point, when damaged, to be replaced without the need for replacing the clamping mechanism.

It is yet another object of the present invention to provide a scarifier tooth assembly which is of simple construction and economical to manufacture.

It is still a further object of the present invention to provide a scarifier tooth assembly which can accommodate inconsistencies in the locking grooves and wear on the bearing surfaces of the shanks to which the assemblies are secured.

It is yet a further object of the present invention to provide a scarifier tooth assembly which is highly durable and resists breakage due to localized shearing forces generated during use.

These and other objects and advantages of the present invention will become apparent from the following detailed description taken in conjunction with the accompanying drawings.

BRIEF DESCRIPTION OF THE DRAWINGS

FIG. 1 is a perspective view of the scarifier tooth assembly of the present invention shown secured to a conventional shank.

FIG. 2 is a side view of the lower portion of the shank illustrating the relationship of the locking grooves to the bearing surface thereon.

FIG. 3 is a top view of the scarifier tooth assembly of the present invention with the shank shown in phantom lines.

FIG. 4 is a side view of the scarifier tooth assembly of the present invention with the shank shown in phantom lines.

FIG. 5 is a sectional view along the lines 5—5 in FIG. 2.

FIG. 6 is an end view of the scarifier tooth assembly with the shank being shown in section.

FIG. 7 is a perspective view of a prior art tooth assembly.

DESCRIPTION OF THE PREFERRED EMBODIMENT

The scarifier tooth assembly 10 of the present invention is comprised of a point 12 and clamp member 14 which are adapted to be secured to a forged steel shank 16. The shank 16 is of a conventional configuration and has an upper portion 18, which is secured to the ripper bar 19 of a motor grader (not shown), and a lower portion 20 which is angularly disposed with respect to the upper portion 18 and carries the tooth assembly 10 as shown in FIG. 1. The lower portion 20 of the shank defines an upper flat bearing surface 22 and has a pair of parallel locking grooves 24 formed in the opposite parallel side walls 26 thereof. The locking grooves 24 are angularly disposed at about 4° with respect to bearing surface 22 to form a wedge-like configuration therebetween illustrated at 25 in FIG. 2.

The point 12 is integrally constructed of forged steel and is through-hardened to a Brinell Hardness of about 500-514 to resist wearing during the digging operation. The point 12 includes a forward digging portion 27 terminating at its rearward end in a shaft portion 38. The forward digging portion 27 defines a relatively thick rearward portion 28 which is sloped relatively steeply along a curved surface 30 into a more gradually inclined surface 32 terminating in a forward digging edge 34. The surface 30 defines a relatively steep angle with respect to surface 32 so as to form a ramp-like surface to throw the material being excavated over the clamping member 14 during use. A detent 36 is preferably provided in surface 30 to aid in the removable of the point from the dye during fabrication. It is to be understood that different configurations of surfaces 32 and/or 30 and edge 34 could be employed to provide the point with differently configured forward digging portions such as the conventional star-shape or to provide the forward digging edge with a carbide tip (not shown), which are both well-known in the industry and used for different digging applications.

The thick-rearward portion 28 of the digging portion 27 of point 12 terminates at its rearward end in a vertical stopwall 37 from which a shaft portion 38 rearwardly extends. Shaft portion 38 defines a lower elongated flat bearing surface 40 extending along the underside thereof, an upper elongated bearing surface 42, the uppermost surface of which extends parallel to lower bearing surfaces 40 but is curvilinear in its transverse dimension (hereinafter referred to as a curvilinear bearing surface), an inclined rear wall portion 44, a pair of lateral ribs 45 extending downwardly adjacent bearing surface 40 forwardly adjacent stop wall 36 and a pair of lateral ear projections 46 disposed at the rearward end of shaft portion 28 and extending downwardly from wall portion 44 adjacent the rearward end of bearing surface 40.

The clamp member 14 is of an inverted "U"-shaped configuration, forged of steel, and through-hardened to a Brinell Hardness of about 444-461 to provide the clamp member 14 with more ductility than point 12. The clamp member 14 defines a forward end 47 adapted to abut the stopwall 37 on point 12, a rearward end 49, parallel leg portions 48 which define a channel 50 and which terminate at their lower ends in inwardly directed parallel flanges 52 and a bar portion 54 which spans leg portions 48. The flanges 52 are angularly disposed downwardly and rearwardly at about 4° with respect to the horizontal, causing channel 50 to be tapered and the forward end 47 of the clamp member to be smaller than the rearward end 49. This 4° inclination of the flanges 52 corresponds to the angular disposition between the locking grooves 24 and the bearing surface 22 in the lower portion of shank 16. The cam member 14 also defines a bearing surface 60 which is curvilinear in its transverse dimension and extends horizontally longitudinally along the underside of the bar portion 48 of the clamp member 14 at the upper end of channel 50. This curvilinear bearing surface 60 is adapted to abut and mate with the curvilinear bearing surface 42 on the shaft portion 36 of point 12.

In use, the shaft portion 38 of point 12 is first inserted through the smaller forward end 47 of the clamp member 14 through channel 50 therein. To enable the ear projections 46 to clear the leg portions 52 of the clamp member, the point 12 has to be rotated 90° so that one of the laterally projecting ear portions 46 can pass through the smaller channeled opening 56 between flanges 52. The point 12 is then rotated back 90° so that the bearing surfaces 42 and 60 on the point 12 and clamp member 14 are in alignment. The clamp member 14 and point 12 are then slid onto the lower portion 20 of the shank 16 with the flanges 52 of the clamp member 14 being disposed within the parallel locking grooves 24 on the shank 16, the flat lower bearing surface 38 on the shaft portion 28 of point 12 resting on the upper flat bearing surface 22 of shank 16, the lateral ribs 45 and the rearwardly disposed lateral ear projections 44 extending about and in contact with portions of the parallel side walls 26 of shank 16 adjacent the upper bearing surface 22 thereof. So positioned, the point and clamp are driven onto the shank by striking either the forward digging edge 34 or the curved surface 30 of the ramp-like central portion 27 of the point 12 with a suitable mallet.

The point is thus wedged onto and tightly secured to the shank by reason of the rearward and downward inclination of the locking grooves 24 in the shank with respect to the upper bearing surface 22 thereon and the corresponding angular disposition of the flanges 52 in the clamp member 14 with respect to the bearing surface 60 therein. As the point 12 and clamping member 14 are driven onto the shank 16 along grooves 24 and bearing surface 22, these relative tapers cause the lower flat bearing surface 40 on the shaft portion 38 of point 12 to be pressed or wedged against and mate with the flat upper bearing surface 22 on the shank 16 and the curvilinear upper bearing surface 42 on the shaft portion 38 to be pressed against and mate with the curvilinear bearing surface 60 extending along the underside of the bar portion 54 of the clamp member 14. Concurrently, the flanges 52 on the clamp member 14 are disposed within the locking grooves 22 on the shaft with the inner wall portions 52' of the flanges bearing against the parallel walls 62 defined by the bottom of the locking grooves 22. The lateral depending ribs 45 and the depending lateral ears 44 on point 12 bear against the sidewalls 26 of the shank to prevent any lateral movement of the point 12 with respect to the shank 16 and thereby prevent the leg portions 48 on the clamp member from being separated when the point 12 is subjected to lateral forces during the digging operation. Accordingly, there is a tight securement both vertically and laterally between the point 12, clamp member 14 and shank 16 wherein the forces generated on the tooth assembly 10 during the digging operation are relatively uniformly distributed over the point and clamp. To remove the point 12 from the shank 16 for replacement of the point, it is only necessary to strike the tapered upper rear wall portion 64 of the clamp member with a suitable mallet to drive the point 12 and clamp member 14 back off the shank 16. A new point could then be secured in the manner described above.

The mating relationship of the curvilinear bearing surfaces 42 and 60 on the point 12 and clamp 14 respectively allow the point and clamp member to rotate slightly with respect to each other during securement and retain their mating relationship to accommodate any inconsistencies in the parallel configuration of the locking grooves 24 during fabrication of the shank 16 or wear on the flat bearing surface of the shank 16. It should also be noted that in the aforedescribed preferred embodiment of the invention, the relative locking tapers are defined by the angular orientation of the locking grooves 24 with respect to the bearing surface 22 on the shank and by the corresponding angular inclination of the flanges 52 on the clamp member 14 with respect to the interior curvilinear bearing surface 60 thereon. In an alternate embodiment of the invention, a similar locking arrangement could be obtained by inclining the lower bearing surface 40 on the shaft portion 38 of point 12 slightly downwardly from the rearward end 47 to the forward end 49 thereof. The locking taper would then be built into the shaft portion 38 of point 12 instead of in the clamp member 14.

Various other changes and modifications could be made in carrying the present invention without departing from the spirit and scope thereof. Insofar as these changes and modifications are within the purview of the appended claims, they are to be considered as part of the present invention.

I claim:

1. A scarifier tooth assembly adapted to be carried by a shank mounted on earth excavation equipment, said assembly comprising an integrally formed point defining a forward digging portion and a rear shaft portion, said shaft portion defining a lower flat elongated bearing surface adapted to mate with and bear against a portion of the shank and an upper curvilinear bearing surface, said point defining means integrally formed therewith and projecting therefrom for extending laterally about portions of the shank to prevent lateral movement of said point with respect to the shank upon said lower flat bearing surface being brought into a mating relationship with the shank, and an integrally formed clamp member defining a curvilinear interior bearing surface and flange means, said interior bearing surface being adapted to abut and mate with said upper curvilinear bearing surface on said shaft portion of said point, said flange means being adapted to engage the shank upon said clamp member being disposed about said shaft portion of said point and said curvilinear interior bearing surface being brought into abutment and mating relationship with said curvilinear bearing surface on said shank portion of said point such that upon urging said point and clamp member onto said shank, said shaft portion of said point is wedged between the shank and said curvilinear interior bearing surface of said clamp member thereby releaseably securing said point to said clamp member and said shank.

2. A scarifier tooth assembly adapted to be carried by a shank mounted on earth excavation equipment, said assembly comprising an integrally formed point defining a forward digging portion and a rear shaft portion, said shaft portion defining a lower flat elongated bearing surface adapted to mate with and bear against a portion of the shank and an upper curvilinear bearing surface, a pair of laterally disposed locking ribs adjacent portions of said lower flat bearing surface and extending downwardly therefrom and a pair of laterally disposed ears at the rearward end of said shank portion of said point adjacent said lower flat bearing surface and extending downwardly therefrom, said ribs and said ears being adapted to abut and extend about portions of the shank for preventing relative lateral movement of said point with respect to the shank upon said lower flat bearing surface being brought into a mated relationship with the shank, and an integrally formed clamp member defining a curvilinear interior bearing surface and flange means, said flange means being adapted to engage the shank upon said clamp member being disposed about said shaft portion of said point and said curvilinear interior bearing surface being brought into abutment and mating relationship with said curvilinear bearing surface on said shank portion of said point such that upon urging said point and clamp member onto said shank, said shaft portion of said point is wedged between the shank and said curvilinear interior bearing surface of said clamp member thereby releaseably securing said point to said clamp member and said shank.

3. The combination of claim 2 wherein said clamp member is of an inverted "U"-shaped configuration defining parallel leg portions, said leg portions terminating at one end thereof in said flange means and at the other end in a bar portion spanning said leg portions, said flange means extending projecting inwardly from said leg portions and said curvilinear interior bearing surface being disposed in said bar portion.

4. The combination of claim 3 wherein said clamp member includes a forward end and a rearward end, said flange means extending from said forward end to said rearward end and being inclined downwardly from said forward end to said rearward end at an angle of about 4°.

5. The combination of claim 3 wherein said forward digging portion of said point is inclined upwardly and rearwardly to define an inclined upper ramp surface terminating at said rear shank portion thereof.

6. A scarifier tooth assembly adapted to be secured to a conventional shank on earth excavation equipment, the shank being of the type having an elongated upper portion carried by the excavation equipment and a lower portion angularly disposed downwardly with respect to the upper portion, integrally formed therewith and defining parallel opposite side walls, a flat inclined bearing surface and a pair of parallel locking grooves formed in the side walls and spaced from and angularly disposed with respect to the bearing surface, said assembly comprising:

an integrally formed point defining a forward digging portion and a shaft portion extending rearwardly therefrom, said shaft portion defining an elongated curvilinear upper bearing surface, an elongated flat lower bearing surface, a pair of lateral ribs and a pair of laterally projecting ears, said ribs and said ears extending downwardly from and adjacent said lower bearing surface and said ears being disposed rearwardly of said ribs; and an integrally formed clamp member of an inverted "U"-shaped configuration defining parallel leg portions terminating in a pair of inwardly projecting elongated flanges, and an interior curvilinear bearing surface disposed between said leg portions, said clamp member being adapted to extend about the shaft portion of said point with said curvilinear bearing surface on said clamp member being in an abutting and mating relationship with said curvilinear bearing surface on said shaft portion and said flanges being angularly disposed with respect to said lower bearing surface on said shaft portion of said point such that upon so disposing said clamp member upon said point and said lower bearing surface on said point upon the bearing surface of the shank and said flanges on said clamp member within the locking grooves upon the shank and urging said clamp member and point onto the shank along said grooves with said ribs and ears extending about and abutting portions of the side walls of the shank, said clamp member and said point are rigidly releaseably secured to the shank.

7. The combination of claim 6 wherein the forward digging portion of said point defines an upwardly inclined ramp surface terminating at said shaft portion of said point whereby during use, the material excavated is directed by said ramp surface over said clamp member.

8. The combination of claim 6 wherein said ears are disposed at the rearward end of said shaft portion of said point and said locking ribs are disposed forwardly of and adjacent the forward end of said shaft portion.

9. The combination of claim 6 wherein the uppermost portion of said upper bearing surface defined by said shaft portion of said point extends parallel to said flat lower bearing surface and said clamp member defines a forward end and a rearward end, said flanges being angled downwardly from said forward end to said rearward end of said clamp member.

10. The combination of claim 6 wherein said elongated flat lower bearing surface is inclined downwardly from said ears to said forward digging portion of said point.

11. The combination of either claims 7 or 8 wherein said point and said clamp member are through-hardened, said clamp member being through-hardened to a lesser degree than said point member whereby said clamp member is more ductile than said point member.

12. The combination of claims 7 or 8 wherein said point member is through-hardened to a Brinell Hardness of about 500–514 and said clamp member is through-hardened to a Brinell Hardness of about 444–461.

13. A scarifier point adapted to be secured to a shank on earth excavation equipment by an inverted "U"-shaped clamp, the shank being of the type having a flat angularly disposed bearing surface in the lower portion thereof and parallel locking grooves in the opposite side walls thereof angularly disposed with respect to the bearing surface to define an inclined wedge therebetween and the clamp defining an internal curvilinear bearing surface and flange members spaced from the curvilinear bearing surface for engaging the locking grooves in the shank and securing the clamp onto the shank, the scarifier point comprising a forward digging portion and a shaft portion integrally formed therewith and extending rearwardly therefrom, said shaft portion defining an elongated flat lower bearing surface adapted to abut and mate with the bearing surface on the shank, an elongated curvilinear upper bearing surface adapted to abut and mate with the interior curvilinear bearing surface on the clamp, a pair of lateral locking ribs adjacent portions of said lower flat bearing surface, extending downwardly therefrom and being disposed intermediary of the ends of said point and a pair of lateral ears disposed at the rearward end of said shaft portion adjacent said lower flat bearing surface and extending downwardly therefrom, said ribs and ears being adapted to abut and extend about portions of the shank upon the lower flat bearing surface of said point being brought into abutment and a mating relationship with the bearing surface on the shank.

14. The combination of claim 13 wherein the forward digging portion of said point defines an upwardly inclined ramp surface terminating at said shaft portion of said point whereby during use, the material excavated is directed by said ramp surface over said clamp member.

15. A scarifier tooth assembly adapted to be carried by a shank mounted on earth excavation equipment, said assembly comprising an integrally formed point defining a forward digging portion and a rear shaft portion, said shaft portion defining a lower flat elongated bearing surface adapted to mate with and bear against a portion of the shank, an upper curvilinear bearing surface and a first lateral retaining means integrally formed therewith and projecting from the rearward end of said shaft portion, and a second lateral retaining means projecting from said point adjacent portions of said lower flat bearing surface, said first and second lateral retaining means extending about portions of the shank and preventing lateral movement of said point with respect to said shank upon said lower flat bearing surface being brought into a mating relationship with the shank, and an integrally formed clamp member defining a curvilinear interior bearing surface and a flange means, said flange means being adapted to engage the shank upon said clamp member being disposed about said shaft portion of said point and said curvilinear interior bearing surface being brought into abutment and mating relationship with said curvilinear bearing surface on said shank portion of said point such that upon urging said point and clamp member onto said shank, said shaft portion of said point is wedged between the shank and said curvilinear interior bearing surface of said clamp member thereby releaseably securing said point to said clamp member and said shank.

* * * * *